US008170055B2

(12) United States Patent
Fang et al.

(10) Patent No.: US 8,170,055 B2
(45) Date of Patent: May 1, 2012

(54) METHOD OF CONVERTING BETWEEN RADIUS MESSAGE AND DIAMETER MESSAGES

(75) Inventors: Qiang Fang, Beijing (CN); Min Liu, Beijing (CN); Yile Enoch Wang, Freehold, NJ (US); Ying Wang, Beijing (CN); Rui Yun Wu, Beijing (CN); Da Bin Yuan, Beijing (CN)

(73) Assignee: Alcatel Lucent, Paris (FR)

( * ) Notice: Subject to any disclaimer, the term of this patent is extended or adjusted under 35 U.S.C. 154(b) by 1881 days.

(21) Appl. No.: 11/320,427

(22) Filed: Dec. 29, 2005

(65) Prior Publication Data
US 2007/0153995 A1     Jul. 5, 2007

(51) Int. Cl.
*H04J 3/22* (2006.01)
(52) U.S. Cl. ........................... 370/466; 370/401
(58) Field of Classification Search ............... 370/342, 370/328–338, 401–427, 466–467; 709/225, 709/227; 379/126; 705/40; 455/410–411
See application file for complete search history.

(56) References Cited

U.S. PATENT DOCUMENTS

| 6,829,473 B2 * | 12/2004 | Raman et al. ............... 455/406 |
| 2002/0039899 A1 * | 4/2002 | Rossman ..................... 455/426 |
| 2004/0156340 A1 * | 8/2004 | Madour ....................... 370/335 |
| 2004/0250136 A1 * | 12/2004 | Trappeniers et al. ......... 713/201 |
| 2006/0045249 A1 * | 3/2006 | Li et al. ....................... 379/126 |
| 2006/0248010 A1 * | 11/2006 | Krishnamoorthy et al. .... 705/40 |
| 2007/0005764 A1 * | 1/2007 | Teppo ........................... 709/225 |
| 2009/0213784 A1 * | 8/2009 | Ang .............................. 370/328 |

OTHER PUBLICATIONS

Ericsson, RFC 3588 Diameter BAse Protocol, Sep. 2003, Network Working Group, standarad Track, 1-114.*
RFc 3588—Diameter Base Protocol, Ericsson, Sep. 2003.*
RFC 4006.
RFC 4005.
RFC 4004.
RFC 3588.
RFC 2869.
RFC 3576.
RFC 2865.
3GPP2 CDMA 2000 Wireless Network Standard, or IS-835.

* cited by examiner

*Primary Examiner* — Pao Sinkantarakorn
*Assistant Examiner* — Iqbal Zaidi
(74) *Attorney, Agent, or Firm* — Harness, Dickey & Pierce, P.L.C.

(57) ABSTRACT

In one embodiment of a method of translating a RADIUS message to a Diameter message, an access request message in RADIUS is translated to a credit control request message in Diameter. In one embodiment of a method of translating a Diameter message to a RADIUS message, a credit control answer message is translated to an access accept message.

16 Claims, 6 Drawing Sheets

METHOD OF CONVERTING BETWEEN RADIUS MESSAGE AND DIAMETER MESSAGES

BACKGROUND OF THE INVENTION

The well-known Remote Authentication Dial in User Service or RADIUS set forth in Request For Comment or RFC 2865 and subsequently extended, such as in RFCs 2869 and 3576, has certain inherent limitations that spurred the IETF on to develop a replacement for AAA (Authentication-Authorization-Accounting) applications. That replacement standard is the well-known Diameter protocol set forth in RFC 3588.

Both 3GPP and 3GPP2 are swiftly moving towards Diameter. The Diameter-based credit control application, jointly supported by the IETF, 3GPP and 3GPP2, provides a framework that delivers online rating and charging capabilities to any network element through the open Diameter interface. Real-time processing of a large volume of rating and charging requests for a huge number of subscribers imposes a high performance demand on data access capabilities. Diameter is expected to meet this demand.

Accordingly, most of the next generation charging architectures are using Diameter as the standard charging interface for both online and offline charging. The IS-835 standard is a notable exception. The IS-835 standard defines the two methods for accessing public networks (Internet) and private networks (intranets): Simple IP and Mobile IP. IS-835C added prepaid charging support and defines the interface between PDSN (packet data serving node), HA (home agent), AAA, and prepaid server. It extended the use of RADIUS Access-Request to authorize prepaid access in addition to general access and provided an Online Access-Request to convey a subsequent credit control request from the PDSN/HA to the AAA/prepaid server. As stated, IS-835 standard uses RADIUS. The primary reasons for this are that Diameter was not ready in time to enable a prepaid solution for 1xRTT and EV-DO packet data services, and RADIUS has been widely deployed in many networks. However, from a prepaid vendor's perspective, supporting both RADIUS and Diameter based online/prepaid charging creates desired functionality and interface overlapping.

One of the applications in Diameter is the mechanical translation of RADIUS messages into Diameter messages. IETF RFC 3588 reserved AVP (attribute value pair) encoding space to support existing RADIUS attributes. IETF RFC 4006 defines the Diameter Network Access Server Application and attempts to achieve backward compatibility to RADIUS through translation. However, prepaid service authentication and authorization falls out of the scope of RFC 4006. Therefore, the mechanical translation is not applicable to IS-835 RADIUS.

SUMMARY OF THE INVENTION

The present invention provides a methodology for translating RADIUS messages into Diameter messages and a methodology for translating Diameter messages to RADIUS messages. The methodologies are applicable to IS-835 RADIUS. Accordingly, embodiments of the present invention relieve vendors from having to support the RADIUS based prepaid service defined in IS-835, and provides a smooth transition that bridges RADIUS-based CDMA prepaid packet data service to the Diameter online architecture such as in 3GPP2.

In one embodiment of a method of translating a RADIUS message to a Diameter message, an access request message in RADIUS is translated to a credit control request message in Diameter. For example, if the access request message is an initial access request message, the initial access request message may be translated to an initial credit control request message. As another example, if the access request message is an on-line access request message that includes an update reason set to one of pre-initialization, initial request, threshold reached, service instance not established, tariff switch update and main SI released, the access request message may be translated to an update credit control request message. In a still further example, if the access request message is an online access request message that includes an update reason set to one of quota reached, remote forced disconnect and client service termination, the access request message may be translated to a final credit control request message.

In another embodiment of a method of translating a RADIUS message to a Diameter message, a disconnect message is translated to an abort session answer message. For example, if the disconnect message is an acknowledgement disconnect message, the disconnect message may be translated to an abort session answer message with a result code set to success. As another example, if the disconnect message is a non-acknowledgement disconnect message, the disconnect message may be translated to an abort session answer message with a result code set to Diameter unable to comply.

In an embodiment of a method of translating a Diameter message to a RADIUS message, a credit control answer message is translated to an access accept message. For example, if the credit control answer message is an initial credit control answer message with a result code set to success, the initial credit control answer message may be translated to an initial access accept message. In another example, if the credit control answer message is an update credit control answer message with a result code set to success, the update credit control answer message may be translated to an online access accept message. In a still further example, if the credit control answer message is a final credit control answer message with a result code set to success, the final credit control answer message may be translated to an online access accept message.

In another embodiment of a method of translating a Diameter message to a RADIUS message, a credit control answer message is translated to an access reject message. For example, if the credit control answer message is an initial credit control answer message with a result code set to one of transient and permanent errors, the initial credit control answer message may be translated to an initial access reject message. As another example, if the credit control answer message is an update credit control answer message with a result code set to one of transient and permanent errors, the update credit control answer message may be translated to an online access reject message. In yet another example, if the credit control answer message is a final credit control answer message with a result code set to one of transient and permanent errors, the final credit control answer message may be translated to an online access reject message.

In a still further embodiment of a method of translating a Diameter message to a RADIUS message, an abort session request message is translated to a disconnect request message.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
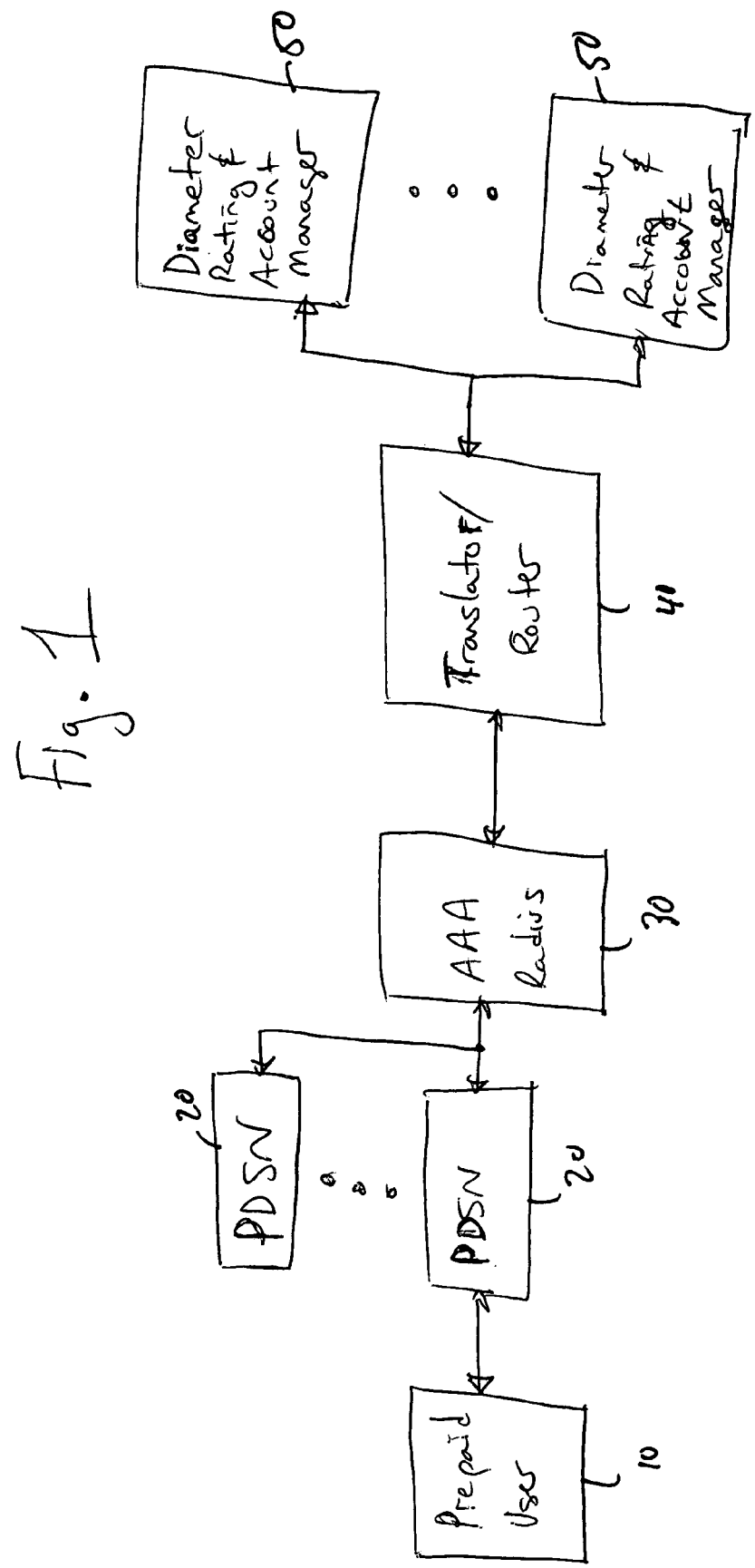
FIG. 1 illustrates a network architecture according to an embodiment of the present invention for implementing the methodologies of the present invention.

As stated above, RADIUS and Diameter are well-known, as are the messages and message formats in these standards and extensions to these standards. Accordingly, the messages and message formats will only be briefly reviewed. This will be followed by a discussion of an example network architecture employing embodiments of the present invention, and with respect to this architecture, example embodiments will be described in detail.

RADIUS Messages and Message Formats

To initially access a RADIUS AAA/prepaid server, an initial Access-Request message is sent. If accepted, the AAA/prepaid server returns an initial Access-Accept message; and if rejected, the AAA/prepaid server returns an initial Access-Reject message. Based on IETF RADIUS RFCs, Chapter 5 of IS-835C defines Access-Request, Access-Accept, and Access Reject message formats for postpaid service. On top of that, Chapter 6 defines Access-Request and Access-Accept for prepaid with added VSAs (vendor specific attributes) given as described below. Access-Reject is kept the same. For the purposes of discussion only, the well-known on-line Access-Request and Access-Accept messages, and attributes associated therewith, will be described. The on-line Access-Request and on-line Access Accept in RADIUS have the following format (remember Access-Reject is kept the same at that of initial Access-Reject for general services):

RADIUS Message Format Table

| Attribute | Type | On-line Access-Request | On-line Access-Accept |
|---|---|---|---|
| User-Name | 1 | 1 | 0-1 |
| User-Password [Note 1] | 2 | 0 | 0 |
| CHAP-Password [Note 1] | 3 | 0 | 0 |
| NAS-IP-Address [Note 5] | 4 | 0-1 | 0 |
| Service-Type [Note 2] | 6 | 1 | 0 |
| Framed-IP-Address [Note 6] | 8 | 0-1 | 0-1 |
| Home Agent | 26/07 | 0-1 | 0-1 |
| Service Option | 26/16 | 0-1 | 0 |
| Correlation ID | 26/44 | 1 | 0-1 |
| Foreign Agent Address | 26/79 | 0-1 | 0 |
| PrePaidAccountingQuota (PPAQ) | 26/90 | 1 | 0-1 |
| PrePaidAccountingCapability (PPAC) | 26/91 | 0 | 0 |
| PrePaidTariffSwitch (PTS) | 26/98 | 0-1 | 0-1 |
| Service Reference ID | 26/94 | 1 | 0 |
| Calling-Station-ID | 31 | 0-1 | 0 |
| NAS-Identifier [Note 5] | 32 | 0-1 | 0 |
| Event-Timestamp [Note 3] | 55 | 0-1 | 0-1 |
| Message-Authenticator [Note 4] | 80 | 1 | 1 |
| NAS-IPv6-Address [Note 5] | 95 | 0-1 | 0 |
| Frame-IPv6-Prefix [Note 6] | 97 | 0-1 | 0-1 |
| Framed-Interface-ID | 96 | 0-1 | 0-1 |

[Note 1] These attributes shall not be specified in an on-line RADIUS Access-Request or on-line RADIUS Access-Accept messages for security reasons.
[Note 2] Service-Type shall be is set to "Authorize Only".
[Note 3] Event-Timestamp is used for Duration based and Tariff Switch PrePaid and it may be used to prevent replay attacks over and above the mechanism provided by RADIUS. When this attribute is present, both the PDSN/HA and the RADIUS server shall check that the Event-Timestamp Attribute is current within an acceptable time window. If the Event-Timestamp Attribute is not current, then the message shall be silently discarded. A default time window of 300 seconds is recommended.
[Note 4] On-line RADIUS Access-Request messages and on-line RADIUS Access Accept messages that are received without a Message-Authenticator shall be silently discarded. Receivers of the Message-Authenticator shall calculate the correct value of the Message-Authenticator and silently discard the packet of it does not match the value sent. The algorithm for computing the Message Authenticator is presented in RFC 2869.
[Note 5] An on-line RADIUS Access Request message shall contain either NAS-Identifier (32) and/or either a NAS-IP-Address (4) or a NAS-IPv6-Address (95).
[Note 6] Either Framed-IP-Address (8) or Framed-IPv6-Address (97) shall be provided in an on-line RADIUS Access-Request.

As evident from the message format given above, the Access-Request and Access-Accept messages may include one or more prepaid attributes. These attributes and their format will now be described in greater detail below.

Prepaid Attributes Table

| Attribute | Type | Access-Request | Access-Accept |
|---|---|---|---|
| PrePaidAccountingQuota (PPAQ) | 26/90 | 0 | 0-1 |
| PrePaidAccountingCapability (PPAC) | 26/91 | 1 | 0-1 |
| PrePaidTariffSwitch (PTS) | 26/98 | 0 | 0-1 |
| Class [Note 1] | 25 | 0 | 0-1 |
| MIP Lifetime [Note 2] | 26/92 | 0-1 | 0-1 |
| SessionTerminationCapability (STC) [Note 3] | 26/88 | 1 | 1 |
| Session Continue [Note 4] | 26/48 | 0-1 | 0 |
| Remote IPv4 Address | 26/59 | 0 | 0+ |
| Remote IPv6 Address | 26/70 | 0 | 0+ |
| Remote Table Index | 26/71 | 0 | 0+ |
| Event-Timestamp [Note 5] | 55 | 0-1 | 0-1 |

[Note 1] A RADIUS Access-Accept or on-line RADIUS Access-Accept messages may contain a single instance of the Class (25) attribute. If received, the PDSN shall include the same Class attribute for each off-line Accounting-Request messages associated with that session. The PDSN shall not modify the contents of the Class (25) attribute. A RADIUS server that receives a Class (25) attribute that has been modified should silently discard the Accounting-Request message.
[Note 2] MIP Lifetime shall be included in the RADIUS Access-Request message from the HA to the Home RADIUS/PPS (prepaid server) if the HA is PrePaid capable. It may be included in the RADIUS Access-Accept message from the Home RADIUS/PPS to HA, in which case, the HA shall include the received value in the MIP RRP sent to the PDSN.
[Note 3] The PDSN shall include the SessionTerminationCapabilityAttribute to indicate that it supports Dynamic Authorization Extensions to RADIUS and Registration Revocation in Mobile IPv4.
[Note 4] At Mobile IP re-registration of a PrePaid packet data session, if the PDSN sends a RADIUS Access-Request message to the Home RADIUS/PPS to authenticate the user, it shall include the Session-Continue VSA with the value set to true.
[Note 5] Event-Timestamp is used for Duration based and Tariff Switch PrePaid and it may be used to prevent replay attacks over and above the mechanism provided by RADIUS. When this attribute is present, both the PDSN/HA and the RADIUS server shall check that the Event-Timestamp Attribute is current within an acceptable time window. If the Event-Timestamp Attribute is not current, then the message shall be silently discarded. A default time window of 300 seconds is recommended.

Attributes and VSAs (Vendor Specific Attributes) used for Prepaid service include:
   PrePaidAccountingQuota (PPAQ)
   PrePaidAccountingCapability (PPAC)
   ReleaseIndicator (F13)
   Remote IPv4 Address
   Remote IPv6 Address
   Remote AddressTable Index
   SessionTerminationCapability (STC)
   MIP RRQ Lifetime
   Service Option
   Service Reference ID
   Session Continue
   PrePaidTariffSwitch (PTS)
PrePaidAccountingQuota (PPAQ):
   This attribute specifies the characteristics for PrePaid accounting of the volume and/or duration of a packet data session. It shall be present in all on-line RADIUS Access-Request and on-line RADIUS Access-Accept messages and may be included in other RADIUS Access-Accept messages. Non-used Sub-Types by the PPC (prepaid client) and PPS shall be omitted. As is known, this VSA has the following format:

```
 1                   2                   3
 0 1 2 3 4 5 6 7 8 9 0 1 2 3 4 5 6 7 8 9 0 1 2 3 4 5 6 7 8 9 0 1
```

| Type | Length | Vendor-ID | |
|---|---|---|---|
| Vendor-ID (cont) | | Vendor-Type | Vendor-Length |
| Sub-Type (=1) | Length | Value(QuotaIDentifier) | |
| Value (QuotaIDentifier) | | Sub-Type (=2) | Length |
| Value (VolumeQuota) | | | |
| Sub-Type (=3) | Length | Value(VolumeQuotaOverflow) | |
| Sub-Type (=4) | Length | Value(VolumeThreshold) | |
| Value (VolumeThreshold) | | Sub-Type (=5) | Length |
| Value(VolumeThresholdOverflow) | | Sub-Type (=6) | Length |
| Value (DurationQuota ) | | | |
| Sub-Type (=7) | Length | Value(DurationThreshold) | |
| Value (DurationThreshold) | | Sub-Type (=8) | Length |
| Value (Update-Reason) | | Sub-Type (=9) | Length |
| PrePaidServer (IPv4 or IPv6 Address) | | | |
| PrePaidServer (IPv6 Address) | | | |
| PrePaidServer IPv6 Address) | | | |
| PrePaidServer (IPv6 Address) | | | | where
   Type: 26
   Length: variable, greater than 8
   Vendor-ID: 5535
   Vendor-Type: 90
   Vendor-Length: variable, greater than 2
   Sub-Type (=1): Sub-Type for QuotaIDentifier attribute
   Length: length of QuotaIDentifier attribute (=6 octets)
   QuotaIDentifier (QID):
      The QuotaIDentifier Sub-Type is generated by the PrePaid server at allocation of a Volume and/or Duration Quota. The on-line quota update RADIUS Access-Request message sent from the PPC to the PPS shall include a previously received QuotaIDentifier.
   Sub-Type (=2): Sub-Type for VolumeQuota attribute
   Length: length of VolumeQuota attribute (=6 octets)
   VolumeQuota (VQ):
      The optional VolumeQuota Sub-Type is only present if Volume Based charging is used. In RADIUS Access-Accept message (PPS to PPC direction), it indicates the Volume (in octets) allocated for the session by the PrePaid server. In on-line RADIUS Access-Request message (PPC to PPS direction), it indicates the total used volume (in octets) for both forward and reverse traffic applicable to PrePaid accounting[1]. If a Tariff Switch condition was reached during the session, this Sub-Type contains the complete (before and after) volume used, while the VolumeUsedAfterTariffSwitch attribute contains the volume used after the tariff switch condition.

[1] Remote Address identified as exempt from PrePaid accounting shall not be accounted for in the volume used returned in the VolumeQuota.

Sub-Type (=3): Sub-Type for VolumeQuotaOverflow
   Length: length of VolumeQuotaOverflow attribute (=4 octets)
   VolumeQuotaOverflow (VQO):
      The optional VolumeQuotaOverflow Sub-Type is used to indicate how many times the VolumeQuota counter has wrapped around $2^{32}$ over the course of the service being provided.
   Sub-Type (=4): Sub-Type for VolumeThreshold attribute
   Length: length of VolumeThreshold attribute (=6 octets)
   VolumeThreshold (VT):
      The VolumeThreshold Sub-Type shall always be present if VolumeQuota is present in a RADIUS Access-Accept message (PPS to PPC direction). It is generated by the PrePaid server and indicates the volume (in octets) that shall be used before requesting quota update. This threshold should not be larger than the VolumeQuota.
   Sub-Type (=5): Sub-Type for VolumeThresholdOverflow
   Length: length of VolumeThresholdOverflow attribute (=4 octets)
   VolumeThresholdOverflow (VTO):
      The optional VolumeThresholdOverflow Sub-type is used to indicate how many times the VolumeThreshold counter has wrapped around $2^{32}$ over the course of the service being provided.
   Sub-Type (=6): Sub-Type for DurationQuota attribute
   Length: length of DurationQuota attribute (=6 octets)
   DurationQuota (DQ):
      The optional DurationQuota Sub-Type is only present if Duration Based charging is used. In RADIUS Access-Accept message (PPS to PPC direction), it indicates the Duration (in seconds) allocated for the session by the PrePaid server. In on-line RADIUS Access-Accept message (PPC to PPS direction), it indicates the total Duration (in seconds) since the start of the accounting session related to the QuotaID.
   Sub-Type (=7): Sub-Type for DurationThreshold attribute
   Length: length of DurationThreshold attribute (=6 octets)
   DurationThreshold (DT):
      The DurationThreshold Sub-Type shall always be present if DurationQuota is present in a RADIUS Access-Accept message (PPS to PPC direction). It represents the duration (in seconds) that shall be used by the session before requesting quota update. This threshold should not be larger than the DurationQuota and shall always be sent with the DurationQuota.
   Sub-Type (=8): Sub-Type for Update-Reason attribute
   Length: length of Update-Reason attribute (=4 octets)
   Update-Reason attribute (UR):
      The Update-Reason Sub-Type shall be present in the on-line RADIUS Access-Request message (PPC to PPS direction). It indicates the reason for initiating the on-line quota update operation. Update reasons 4, 5, 6, 7 and 8 indicate that the associated resources are released at the client side, and therefore the PPS shall not allocate a new quota in the RADIUS Access-Accept message. The update reasons include:
1. Pre-initialization
2. Initial request
3. Threshold reached
4. Quota reached
5. Remote Forced disconnect
6. Client Service termination
7. Main SI released
8. Service Instance not established
9. Tariff Switch Update Sub-Type (=9): Sub-Type for PrePaidServer attribute
Length: Length of PrePaidServer (IPv4=6 octets, IPv6=18 octets
PrePaidServer:
  The optional, multi-value PrePaidServer indicates the address of the serving PrePaid System. If present, the Home RADIUS server uses this address to route the message to the serving PrePaid Server. The attribute may be sent by the Home RADIUS server. If present in the incoming RADIUS Access-Accept message, the PDSN shall send this attribute back without modifying it in the subsequent RADIUS Access-Request message, except for the first one. If multiple values are present, the PDSN shall not change the order of the attributes.

PrePaidAccountingCapability (PPAC):
  This attribute specifies the capability for PrePaid accounting for a packet data session. It contains the possible capabilities of the PrePaid client and the selected (by the PrePaid server) capability for the session. The absence of this VSA indicates that the client is not capable of PrePaid Accounting and the session shall not use PrePaid accounting. As is known, this VSA has the following format:

```
                    1                   2                   3
0 1 2 3 4 5 6 7 8 9 0 1 2 3 4 5 6 7 8 9 0 1 2 3 4 5 6 7 8 9 0 1
```

| Type | Length | Vendor-ID |
|---|---|---|
| Vendor-ID (cont) | Vendor-Type | Vendor-Length |
| Sub-Type (=1) | Length | Value(AvailableInClient) |
| Value (AvailableInClient) | Sub-Type (=2) | Length |
| Value (SelectedForSession) | | | where Type: 26
Length: variable, greater than 8
Vendor-ID: 5535
Vendor-Type: 91
Vendor-Length: variable, greater than 2
Sub-Type (=1): Sub-Type for AvailableInClient attribute
Length: length of AvailableInClient attribute (=6 octets)
AvailableInClient (AiC):
  The optional AvailableInClient Sub-Type, generated by the PrePaid client, indicates the PrePaid Accounting capabilities of the client in the PDSN or HA and shall be bitmap encoded. The possible values are:

| | |
|---|---|
| 0x00000001 | PrePaid Accounting for Volume supported |
| 0x00000010 | PrePaid Accounting for Duration supported |
| 0x00000011 | PrePaid Accounting for Volume and Duration supported (non concurrently) |
| Others | Reserved, treat like Not Capable of PrePaid Accounting (=0). |

Sub-Type (=2): Sub-Type for SelectedForSession attribute
Length: length of SelectedForSession attribute (=6 octets)
SelectedForSession (SfS):
  The optional SelectedForSession Sub-Type, generated by the PrePaid server, indicates the PrePaid Accounting capability to be used for a given session.
  The possible values are:

| | |
|---|---|
| 0x00000000 | PrePaid Accounting not used |
| 0x00000001 | Usage of PrePaid Accounting for Volume. (only possible if the AvailableInClient supports PrePaid Accounting for Volume) |
| 0x00000010 | Usage of PrePaid Accounting for Duration. (only possible if the AvailableInClient supports PrePaid Accounting for Duration) |
| 0x00000011 | Usage of PrePaid Accounting for Volume and Duration (non concurrent) (only possible if the AvailableInClient supports PrePaid Accounting for Volume and duration) |
| Others | Reserved, treat like PrePaid Accounting not used (=0). |

PrePaidTariffSwitching (PTS):
  This VSA specifies the characteristics for PrePaid accounting when Tariff Switching is used. If the PTS VSA is included in the on-line RADIUS Access-Request/Accept messages or RADIUS Access-Accept message, the PPAQ VSA shall also be included. It may be present in on-line RADIUS Access-Request and on-line RADIUS Access-Accept messages and may be included in other RADIUS Access-Accept messages. Non-used Sub-Types by the PPS shall be omitted. As is known, this VSA has the following format:

```
                    1                   2                   3
0 1 2 3 4 5 6 7 8 9 0 1 2 3 4 5 6 7 8 9 0 1 2 3 4 5 6 7 8 9 0 1
```

| Type | Length | Vendor-ID |
|---|---|---|
| Vendor-ID (cont) | Vendor-Type | Vendor-Length |
| Sub-Type (=1) | Length | Value(QuotaIDentifier) |
| Value (QuotaIDentifier) | Sub-Type (=2) | Length |
| Value (VolumeUsedAfterTariffSwitch) | | |
| Sub-Type (=3) | Length | Value(VolumeUsed-ATSOverflow) |
| Sub-Type (=4) | Length | Value(TariffSwitchInterval) |
| Value (TariffSwitchInterval) | Sub-Type (=5) | Length |
| Value [TimeIntervalafterTariffSwitchUpdate] | | | where
Type: 26
Length: variable, greater than 8
Vendor-ID: 5535
Vendor-Type: 98
Vendor-Length: variable, greater than 2
Sub-Type (=1): Sub-Type for QuotaIDentifier attribute
Length: length of QuotaIDentifier attribute (=6 octets)
QuotaIDentifier (QID):
  The QuotaIDentifier Sub-Type is generated by the PrePaid server at allocation of a Volume Quota. The on-line quota update RADIUS Access-Request message sent from the PPC to the PPS shall include a previously received QuotaIDentifier. The QuotaIDentifier value used in the PTS VSA shall be the same to the one included in the PPAQ VSA.

Sub-Type (=2): Sub-Type for VolumeUsedAfterTariff-Switch attribute
Length: length of VolumeUsedAfterTariffSwitch attribute (=6 octets)
VolumeUsedAfterTariffSwitch (VUATS):
  The VolumeUsedAfterTariffSwitch Sub-Type is only present if Volume Based charging is used and the RADIUS message is an on-line RADIUS Access-Request message (PPC to PPS direction). It indicates the total used volume (in octets) for both forward and reverse traffic applicable to PrePaid accounting after a Tariff Switch condition was reached during the session. If no Tariff Switch condition was reached, the PTS VSA shall not be present in the on-line RADIUS Access-Request message. The total volume used before and after the Tariff Switch is reported in the VolumeQuota Sub-Type in the associated PPAQ VSA.
Sub-Type (=3): Sub-Type for VolumeUsedATSOverflow
Length: length of VolumeUsedATSOverflow attribute (=4 octets)
VolumeUsedATSOverflow (VUATSO):
  The optional VolumeUsedAfterTariffSwitchOverflow Sub-Type is used to indicate how many times the VolumeUsedAfterTariffSwitch counter has wrapped around $2^{32}$ over the course of the service being provided.
Sub-Type (=4): Sub-Type for TariffSwitchInterval attribute
Length: length of TariffSwitchInterval attribute (=6 octets)
TariffSwitchInterval (TSI):
  The TariffSwitchInterval Sub-Type is present if Volume Based charging is used and the RADIUS message is a RADIUS Access-Accept (PPS to PPC direction). It indicates the interval (in seconds) between the time stamp (G4) of the corresponding on-line RADIUS Access-Request and the next tariff switch condition. If no Tariff Switch condition is required, the PTS VSA shall not be present. The total volume used before and after the Tariff Switch is reported in the VolumeQuota Sub-Type in the PPAQ VSA, and the volume used after the Tariff Switch is reported in the VolumeUsedAfterTariffSwitch Sub-Type in the PTS VSA.
Sub-Type (=5): Sub-Type for
TimeIntervalafterTariffSwitchUpdate attribute
Length: Length of TimeIntervalafterTariffSwitchUpdate (=6 octets)
TimeIntervalafterTariffSwitchUpdate (TITSU):
  The TimeIntervalafterTariffSwitchUpdate Sub-Type may be present when Volume Based tariff switching is used. The Home RADIUS/PPS may send it to the PPC in the RADIUS Access-Accept message only if the TSI Sub-Type is also present. It corresponds to the duration after TSI where an on-line RADIUS Access-Request message may be sent by the PrePaid capable PDSN to report VUATS before the next tariff switch condition is triggered in the Home RADIUS/PPS.

Other well-known messages in RADIUS include a Disconnect-Request message, a Disconnect-Acknowledgement (ACK) message and a Disconnect-Non-acknowledgement (NACK) message. The Disconnect-Request message requests termination of the current session with the AAA/prepaid server. The Disconnect-ACK message is sent when the AAA/prepaid server complies with the request, and the Disconnect-NACK message is sent when the AAA/prepaid server is unable to comply.

Diameter Messages and Message Formats

As mentioned above, the Diameter base protocol is intended to provide an Authentication, Authorization and Accounting (AAA) framework for applications such as network access or IP mobility. Diameter is also intended to work in both local Authentication, Authorization & Accounting and roaming situations. While well-known and specified in RFC 3588, the message format for Diameter will be briefly reviewed here.

The Diameter protocol consists of the Diameter header followed by one or more AVP structures.

| MAC header | IP header | SCTP header | Diameter header | Data ::: |
| MAC header | IP header | TCP header | Diameter header | Data ::: |

Diameter header:

| 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 | 2 | 2 | 2 | 2 | 2 | 2 | 3 | 3 |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| Version | Message length |
| Flags | Code |
| Application ID | |
| Hop by Hop ID | |
| End to End ID | |
| AVP[ ] ::: | |

Version. 8 bits.
Diameter protocol version.
Message length. 24 bits.
Size of the Diameter message including the header fields.
Flags. 8 bits.

| 00 | 01 | 02 | 03 | 04 | 05 | 06 | 07 |
| R | P | E | T | reserved | | | |

R, Request. 1 bit.
If set, the message is a request. Otherwise the message is an answer.
P, Proxiable. 1 bit.
If set, the message MAY be proxied, relayed or redirected. Otherwise the message MUST be locally processed.
E, Error. 1 bit.
If set, the message contains a protocol error, and the message will not conform to the ABNF described for this command. Messages with this bit set are commonly referred to as error messages. This bit MUST NOT be set in request messages.
T, Potentially retransmitted message. 1 bit.
This flag is set after a link failover procedure, to aid the removal of duplicate requests. It is set when resending requests not yet acknowledged, as an indication of a possible duplicate due to a link failure. This bit MUST be cleared when sending a request for the first time, otherwise the sender MUST set this flag. Diameter agents only need to be concerned about the number of requests they send based on a single received request; retransmissions by other entities need not be tracked. Diameter agents that receive a request with the T flag set, MUST keep the T flag set in the forwarded request. This flag MUST NOT be set if an error answer message (e.g., a protocol error) has been received for the earlier message. It can be set only in cases where no answer has been received from the server for a request and the request is sent again. This flag MUST NOT be set in answer messages.
reserved. 4 bits.
Must be cleared to zero.

Code. 24 bits.

| Code | Description | References |
|---|---|---|
| 0–255 | Radius command codes. | |
| 256 | | |
| 257 | CER; CEA. | |
| 258 | RAR, Re-Auth-Request; RAA, Re-Auth-Answer. | RFC 4005 |
| 260 | AMR, AA-Mobile-Node-Request; AMA, AA-Mobile-Node-Answer. | RFC 4004 |
| 262 | HAR, Home-Agent-MIP-Request; HAA, Home-Agent-MIP-Answer. | RFC 4004 |
| 263 | | |
| 264 | | |
| 265 | AAR, AA-Request; AAA, AA-Answer. | RFC 4005 |
| 266 | | |
| 267 | | |
| 268 | DER, Diameter-EAP-Request; DEA, Diameter-EAP-Answer. | RFC 4072 |
| 269 | | |
| 270 | | |
| 271 | ACR, Accounting-Request; ACA, Accounting-Answer. | RFC 4005 |
| 272 | CCR, Credit-Control-Request; CCA, Credit-Control-Answer. | RFC 4006 |
| 273 | | |
| 274 | ASR, Abort-Session-Request; ASA, Abort-Session-Answer. | RFC 4005 |
| 275 | STR, Session-Termination-Request; STA, Session-Termination-Answer. | RFC 4005 |
| 276–279 | | |

Application ID. 32 Bits.

Used to identify to which application the message is applicable for. The application can be an authentication application, an accounting application or a vendor specific application. The application ID in the header MUST be the same as what is contained in any relevant AVPs contained in the message.

Hop by Hop ID. 32 Bits, Unsigned.

This field aids in matching requests and replies. The sender MUST ensure that the identifier in a request is unique on a given connection at any given time, and MAY attempt to ensure that the number is unique across reboots. The sender of an Answer message MUST ensure that this field contains the same value that was found in the corresponding request. The identifier is normally a monotonically increasing number, whose start value was randomly generated. An answer message that is received with an unknown identifier MUST be discarded.

End to End ID. 32 Bits, Unsigned.

This field is used to detect duplicate messages. Upon reboot implementations MAY set the high order 12 bits to contain the low order 12 bits of current time, and the low order 20 bits to a random value. Senders of request messages MUST insert a unique identifier on each message. The identifier MUST remain locally unique for a period of at least 4 minutes, even across reboots. The originator of an Answer message MUST ensure that the field contains the same value that was found in the corresponding request. This field MUST NOT be modified by Diameter agents of any kind. The combination of the Origin-Host and this field is used to detect duplicates. Duplicate requests SHOULD cause the same answer to be transmitted (modulo the Hop by Hop ID field and any routing AVPs that may be present), and MUST NOT affect any state that was set when the original request was processed. Duplicate answer messages that are to be locally consumed SHOULD be silently discarded.

AVP, Attribute Value Pair.

A structure used to encapsulate protocol specific data as well as authentication, authorization and accounting information.

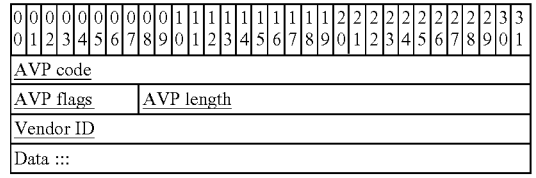

AVP Code. 32 Bits.

When combined with the Vendor ID the attribute is uniquely identified. AVP numbers 1 through 255 are reserved for backward compatibility with RADIUS, without setting the Vendor ID field. AVP numbers 256 and above are used for Diameter, which are allocated by IANA.

| Code | Description | References |
|---|---|---|
| 1-255 | Radius attributes. | |
| 256 | | |
| 257 | Host-IP-Address. | RFC 3588 |
| 258 | Auth-Application-Id. | RFC 3588 |
| 259 | Acct-Application-Id. | RFC 3588 |
| 260 | Vendor-Specific-Application-Id. | RFC 3588 |
| 261 | Redirect-Host-Usage. | |
| 262 | Redirect-Max-Cache-Time. | |
| 263 | Session-Id. | |
| 264 | Origin-Host. | |
| 265 | Supported-Vendor-Id. | |
| 266 | Vendor-Id. | |
| 267 | Firmware-Version. | |
| 268 | Result-Code. | |
| 269 | Product-Name. | |
| 270 | Session-Binding. | |
| 271 | Session-Server-Failover. | |
| 272 | Multi-Round-Time-Out. | |
| 273 | Disconnect-Cause. | |
| 274 | Auth-Request-Type. | |
| 275 | | |
| 276 | Auth-Grace-Period. | |
| 277 | Auth-Session-State. | |
| 278 | Origin-State-Id. | |
| 279 | Failed-AVP. | |
| 280 | Proxy-Host. | |
| 281 | Error-Message. | |
| 282 | Route-Record. | |
| 283 | Destination-Realm. | |
| 284 | Proxy-Info. | |
| 285 | Re-Auth-Request-Type. | |
| 286-290 | | |
| 291 | Authorization-Lifetime. | |
| 292 | Redirect-Host. | |
| 293 | Destination-Host. | |
| 294 | Error-Reporting-Host. | |
| 295 | Termination-Cause. | RFC 4005 |
| 296 | Origin-Realm. | |
| 297 | Experimental-Result. | |
| 298 | Experimental-Result-Code. | |
| 299 | Inband-Security-Id. | |
| 300 | E2E-Sequence. | |
| 301-317 | | |
| 318 | MIP-FA-to-HA-SPI. | RFC 4004 |
| 319 | MIP-FA-to-MN-SPI. | RFC 4004 |
| 320 | MIP-Reg-Request. | RFC 4004 |
| 321 | MIP-Reg-Reply. | RFC 4004 |
| 322 | MIP-MN-AAA-Auth. | RFC 4004 |
| 323 | MIP-HA-to-FA-SPI. | RFC 4004 |
| 324 | | |
| 325 | MIP-MN-to-FA-MSA. | RFC 4004 |

-continued

| Code | Description | References |
|---|---|---|
| 326 | MIP-FA-to-MN-MSA. | RFC 4004 |
| 327 | | |
| 328 | MIP-FA-to-HA-MSA. | RFC 4004 |
| 329 | MIP-HA-to-FA-MSA. | RFC 4004 |
| 331 | MIP-MN-to-HA-MSA. | RFC 4004 |
| 332 | MIP-HA-to-MN-MSA. | RFC 4004 |
| 333 | MIP-Mobile-Node-Address. | RFC 4004 |
| 334 | MIP-Home-Agent-Address. | RFC 4004 |
| 335 | MIP-Nonce. | RFC 4004 |
| 336 | MIP-Candidate-Home-Agent-Host. | RFC 4004 |
| 337 | MIP-Feature-Vector. | RFC 4004 |
| 338 | MIP-Auth-Input-Data-Length. | RFC 4004 |
| 339 | MIP-Authenticator-Length. | RFC 4004 |
| 340 | MIP-Authenticator-Offset. | RFC 4004 |
| 341 | MIP-MN-AAA-SPI. | RFC 4004 |
| 342 | MIP-Filter-Rule. | RFC 4004 |
| 343 | MIP-Session-Key. | RFC 4004 |
| 344 | MIP-FA-Challenge. | RFC 4004 |
| 345 | MIP-Algorithm-Type. | RFC 4004 |
| 346 | MIP-Replay-Mode. | RFC 4004 |
| 347 | MIP-Originating-Foreign-AAA. | RFC 4004 |
| 348 | MIP-Home-Agent-Host. | RFC 4004 |
| 349-362 | | |
| 363 | Accounting-Input-Octets. | RFC 4005 |
| 364 | Accounting-Output-Octets. | RFC 4005 |
| 365 | Accounting-Input-Packets. | RFC 4005 |
| 366 | Accounting-Output-Packets. | RFC 4005 |
| 367 | MIP-MSA-Lifetime. | RFC 4004 |
| 368-399 | | |
| 400 | NAS-Filter-Rule. | RFC 4005 |
| 401 | Tunneling. | RFC 4005 |
| 402 | CHAP-Auth. | RFC 4005 |
| 403 | CHAP-Algorithm. | RFC 4005 |
| 404 | CHAP-Ident. | RFC 4005 |
| 405 | CHAP-Response. | RFC 4005 |
| 406 | Acounting-Auth-Method. | RFC 4005 |
| 407 | QoS-Filter-Rule. | RFC 4005 |
| 408 | Origin-AAA-Protocol. | RFC 4005 |
| 409 | | |
| 410 | | |
| 411 | CC-Correlation-Id. | RFC 4006 |
| 412 | CC-Input-Octets. | RFC 4006 |
| 413 | CC-Money. | RFC 4006 |
| 414 | CC-Output-Octets. | RFC 4006 |
| 415 | CC-Request-Number. | RFC 4006 |
| 416 | CC-Request-Type. | RFC 4006 |
| 417 | CC-Service-Specific-Units. | RFC 4006 |
| 418 | CC-Session-Failover. | RFC 4006 |
| 419 | CC-Sub-Session-Id. | RFC 4006 |
| 420 | CC-Time. | RFC 4006 |
| 421 | CC-Total-Octets. | RFC 4006 |
| 422 | Check-Balance-Result. | RFC 4006 |
| 423 | Cost-Information. | RFC 4006 |
| 424 | Cost-Unit. | RFC 4006 |
| 425 | Currency-Code. | RFC 4006 |
| 426 | Credit-Control. | RFC 4006 |
| 427 | Credit-Control-Failure-Handling. | RFC 4006 |
| 428 | Direct-Debiting-Failure-Handling. | RFC 4006 |
| 429 | Exponent. | RFC 4006 |
| 430 | Final-Unit-Indication. | RFC 4006 |
| 431 | Granted-Service-Unit. | RFC 4006 |
| 432 | Rating-Group. | RFC 4006 |
| 433 | Redirect-Address-Type. | RFC 4006 |
| 434 | Redirect-Server. | RFC 4006 |
| 435 | Redirect-Server-Address. | RFC 4006 |
| 436 | Requested-Action. | RFC 4006 |
| 437 | Requested-Service-Unit. | RFC 4006 |
| 438 | Restriction-Filter-Rule. | RFC 4006 |
| 439 | Service-Identifier. | RFC 4006 |
| 440 | Service-Parameter-Info. | RFC 4006 |
| 441 | Service-Parameter-Type. | RFC 4006 |
| 442 | Service-Parameter-Value. | RFC 4006 |
| 443 | Subscription-Id. | RFC 4006 |
| 444 | Subscription-Id-Data. | RFC 4006 |
| 445 | Unit-Value. | RFC 4006 |
| 446 | Used-Service-Unit. | RFC 4006 |
| 447 | Value-Digits. | RFC 4006 |
| 448 | Validity-Time. | RFC 4006 |
| 449 | Final-Unit-Action. | RFC 4006 |
| 450 | Subscription-Id-Type. | RFC 4006 |
| 451 | Tariff-Time-Change. | RFC 4006 |
| 452 | Tariff-Change-Usage. | RFC 4006 |
| 453 | G-S-U-Pool-Identifier. | RFC 4006 |
| 454 | CC-Unit-Type. | RFC 4006 |
| 455 | Multiple-Services-Indicator. | RFC 4006 |
| 456 | Multiple-Services-Credit-Control. | RFC 4006 |
| 457 | G-S-U-Pool-Reference. | RFC 4006 |
| 458 | User-Equipment-Info. | RFC 4006 |
| 459 | User-Equipment-Info-Type. | RFC 4006 |
| 460 | User-Equipment-Info-Value. | RFC 4006 |
| 461 | Service-Context-Id. | RFC 4006 |
| 462 | EAP-Payload. | RFC 4072 |
| 463 | EAP-Reissued-Payload. | RFC 4072 |
| 464 | EAP-Master-Session-Key. | RFC 4072 |
| 465 | Accounting-EAP-Auth-Method. | RFC 4072 |
| 466-479 | | |
| 480 | Accounting-Record-Type. | |
| 481 | | |
| 482 | | |
| 483 | Accounting-Realtime-Required. | |
| 484 | | |
| 485 | Accounting-Record-Number. | |
| 486 | | |
| 487 | Accounting-Sub-Session-Id. | |
| 488-0xFFFFFF | | |

AVP Flags. 8 Bits.

| 00 | 01 | 02 | 03 | 04 | 05 | 06 | 07 |
|---|---|---|---|---|---|---|---|
| V | M | P | reserved | | | | |

V, Vendor specific. 1 bit.
If set, the Vendor ID field is present.
M, Mandatory. 1 bit.
If set, support of this AVP is required.
P. 1 bit.
If set, encryption for end to end security is needed.
reserved. 5 bits.
Must be cleared to zero.

AVP Length. 24 Bits.
Total size of the AVP header and data in bytes.
Vendor ID. 32 Bits.
This field is present if the V bit is set in the AVP Flags field. This field contains the IANA assigned "SMI Network Management Private Enterprise Codes" value, encoded in network byte order. Any vendor wishing to implement a vendor-specific Diameter AVP MUST use their own Vendor ID along with their privately managed AVP address space, guaranteeing that they will not collide with any other vendor's vendor-specific AVP(s), nor with future IETF applications. A value of zero corresponds to the IETF adopted AVP values, as managed by the IANA. Since the absence of this field implies that the AVP in question is not vendor specific, implementations MUST NOT use the zero value.

As indicated above, several of the message format items are described in other RFCs. While well-known, aspects of RFC 4006 will be reviewed here briefly. RFC 4006 specifies a Diameter application that can be used to implement real-time credit-control for a variety of end user services such as network access, Session Initiation Protocol (SIP) services, messaging services, and download services. It provides a general solution to real-time cost and credit-control. In particular, RFC 4006 defines new Diameter messages; namely new Command-Code values that MUST be supported by all Diameter implementations that conform to this specification. The new messages are a Credit-Control-Request (CCR) and a Credit-Control-Answer (CCA).

The Credit-Control-Request message (CCR) is indicated by the command-code field being set to 272 and the 'R' bit being set in the Command Flags field. It is used between the Diameter credit-control client and the credit-control server to request credit authorization for a given service. The Auth-Application-Id MUST be set to the value 4, indicating the Diameter credit-control application.

The CCR message format is as follows:

```
<Credit-Control-Request> ::= < Diameter Header: 272, REQ, PXY >
                             < Session-Id >
                             { Origin-Host }
                             { Origin-Realm }
                             { Destination-Realm }
                             { Auth-Application-Id }
                             { Service-Context-Id }
                             { CC-Request-Type }
                             { CC-Request-Number }
                             [ Destination-Host ]
                             [ User-Name ]
                             [ CC-Sub-Session-Id ]
                             [ Acct-Multi-Session-Id ]
                             [ Origin-State-Id ]
                             [ Event-Timestamp ]
                             [ Subscription-Id ]
                             [ Service-Identifier ]
                             [ Termination-Cause ]
                             [ Requested-Service-Unit ]
                             [ Requested-Action ]
                             [ Used-Service-Unit ]
                             [ Multiple-Services-Indicator ]
                             [ Multiple-Services-Credit-Control ]
                             [ Service-Parameter-Info ]
                             [ CC-Correlation-Id ]
                             [ User-Equipment-Info ]
                             [ Proxy-Info ]
                             [ Route-Record ]
                             [ AVP ]
```

The Credit-Control-Answer message (CCA) is indicated by the command-code field being set to 272 and the 'R' bit being cleared in the Command Flags field. It is used between the credit-control server and the Diameter credit-control client to acknowledge a Credit-Control-Request command. The CCA message format is as follows:

```
<Credit-Control-Answer> ::= < Diameter Header: 272, PXY >
                            < Session-Id >
                            { Result-Code }
                            { Origin-Host }
                            { Origin-Realm }
                            { Auth-Application-Id }
                            { CC-Request-Type }
                            { CC-Request-Number }
                            [ User-Name ]
                            [ CC-Session-Failover ]
                            [ CC-Sub-Session-Id ]
                            [ Acct-Multi-Session-Id ]
                            [ Origin-State-Id ]
                            [ Event-Timestamp ]
                            [ Granted-Service-Unit ]
                            [ Multiple-Services-Credit-Control]
                            [ Cost-Information]
                            [ Final-Unit-Indication ]
                            [ Check-Balance-Result ]
                            [ Credit-Control-Failure-Handling ]
                            [ Direct-Debiting-Failure-Handling ]
                            [ Validity-Time]
                            [ Redirect-Host]
```

-continued
```
                            [ Redirect-Host-Usage ]
                            [ Redirect-Max-Cache-Time ]
                            [ Proxy-Info ]
                            [ Route-Record ]
                            [ Failed-AVP ]
                            [ AVP ]
```

Because Diameter and the CCR and CCA messages are so well-known, they will not be reviewed in detail here for the sake of brevity. However, as the discussion above reveals, Diameter messages employ AVPs. All data delivered by the protocol is in the form of an AVP. Some of these AVP values are used by the Diameter protocol itself, while others deliver data associated with particular applications that employ Diameter. AVPs may be added arbitrarily to Diameter messages, so long as the required AVPs are included and AVPs that are explicitly excluded are not included.

Other example message in Diameter include an abort session request message and an abort session answer message. The abort session request message requests termination of the current session with the manager server. The abort session answser message indicates whether the manager server complies with the request (e.g., result code set to success) or is unable to comply with the request (e.g., result code set to Diameter unable to comply).

Example Architecture

FIG. 1 illustrates a network architecture according to an embodiment of the present invention for implementing the methodologies of the present invention. As shown, a prepaid user 10 may access the network via a packet data service node or PDSN 20. The prepaid user 10 may connect with the PDSN 20 via wireline or wireless infrastructure. For example, the prepaid user 10 may be a mobile station subscriber, where a mobile station may be a wireless phone, wireless equipped PDA, wireless equipped computer, etc. As shown, a network may include a number of PDSNs 20 with which a prepaid user may connect. As will be appreciated, intermediate network elements (e.g., intermediate wireless network elements such as a base station, etc. have not been shown for the sake of clarity).

The PDSN 20 communicates with AAA RADIUS servers 30 in any well-known manner to perform the authentication, authorization and accounting for the prepaid user 10. As shown, RADIUS servers 30 may service a number of PDSNs 20.

In this embodiment, the RADIUS messages are sent by the RADIUS servers 30 to a translator/router 40. The translator/router 40 translates the RADIUS message into a Diameter message, and routes the Diameter message to an appropriate Diameter rating and account manager 50 (hereinafter Diameter manager). As will be appreciated, the Diameter messages may be routed over, for example, an IP network to the Diameter managers 50. Both the translation functionality and the routing functionality of the translator/router 40 will be described in detail below.

The Diameter manager 50 processes the received Diameter message as is well-known in the art, and may send a Diameter message in response. This sent Diameter message will be sent or routed to the translator/router 40. The translator/router 40 translates the Diameter message sent from the Diameter manager 40 to a RADIUS message. This further translation functionality will be described in detail below. The translator/router 40 then sends the RADIUS message to the RADIUS servers 30, which process the RADIUS message in the well-known manner.

As is known, Diameter messages may be routed to an appropriate Diameter manager based on the (mobile directory number) MDN of the prepaid user's mobile station. Accordingly, the MDN in the RADIUS Initial Access-Request message received by the translator/router 40 is used to route the Diameter message to the proper Diameter manager 50 in the well known manner. Once the translator/router 40 determines the corresponding Diameter manager 50, it binds the session to that particular manager 50 by inserting the manager's IP address in the PrepaidServer subtype attribute of PPAQ in the Access-Accept message. All the subsequent Online Access-Request messages will always include the PrepaidServer. Therefore, the translator/router 40 does not need to perform routing lookup or state determination to bind messages of a session to one Diameter manager 50. It simply extracts the PrepaidServer subtype from PPAQ and uses it to send the message accordingly. As a consequence, the translator/router 40 is fully stateless; thus allowing N+k configurations (i.e., N active servers with k backup servers) to achieve high service availability.

Next, an embodiment of a method for translating RADIUS messages to Diameter messages will be described. In this embodiment, RADIUS messages are translated to Diameter messages as shown below in Table 1.

TABLE 1

RADIUS to Diameter Message Translation

| From - RADIUS | To - Diameter |
|---|---|
| Initial Access-Request | Credit Control Request (Initial) |
| Online Access-Request with Update-Reason set to: Pre-initialization Initial Request Threshold Reached Service Instance Not Established Tariff Switch Update Main SI Released | Credit Control Request (Update) |
| Online Access-Request with Update-Reason set to: Quota Reached Remote Forced Disconnect Client Service Termination | Credit Control Request (Final) |
| Disconnect - ACK | Abort-Session-Answer with Result-Code set to SUCCESS (2001) |
| Disconnect - ACK | Abort-Session-Answer with Result-Code to DIAMETER_UNABLE_TO_COMPLY (5012) |

Figure 2:
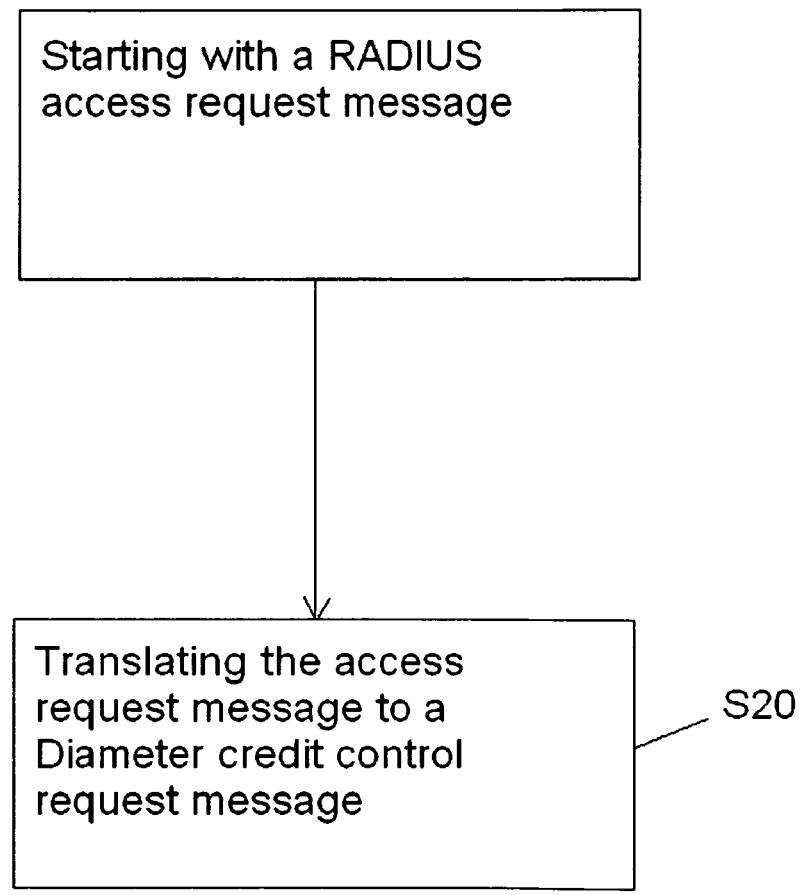
FIG. 2 illustrates method steps associated with translating a RADIUS access request message to a Diameter credit control request message.

As shown in Table 1, an access request message in RADIUS is translated to a credit control request message in Diameter, as shown in S20 of FIG. 2. For example, if the access request message is an initial access request message, the initial access request message may be translated to an initial credit control request message. As another example, if the access request message is an on-line access request message that includes an update reason set to one of pre-initialization, initial request, threshold reached, service instance not established, tariff switch update and main SI released, the access request message may be translated to an update credit control request message. In the above, SI stands for Service Instance. Per IS-835, multiple services instances may be allowed on a mobile. In a still further example, if the access request message is an online access request message that includes an update reason set to one of quota reached, remote forced disconnect and client service termination, the access request message may be translated to a final credit control request message.

Figure 3:
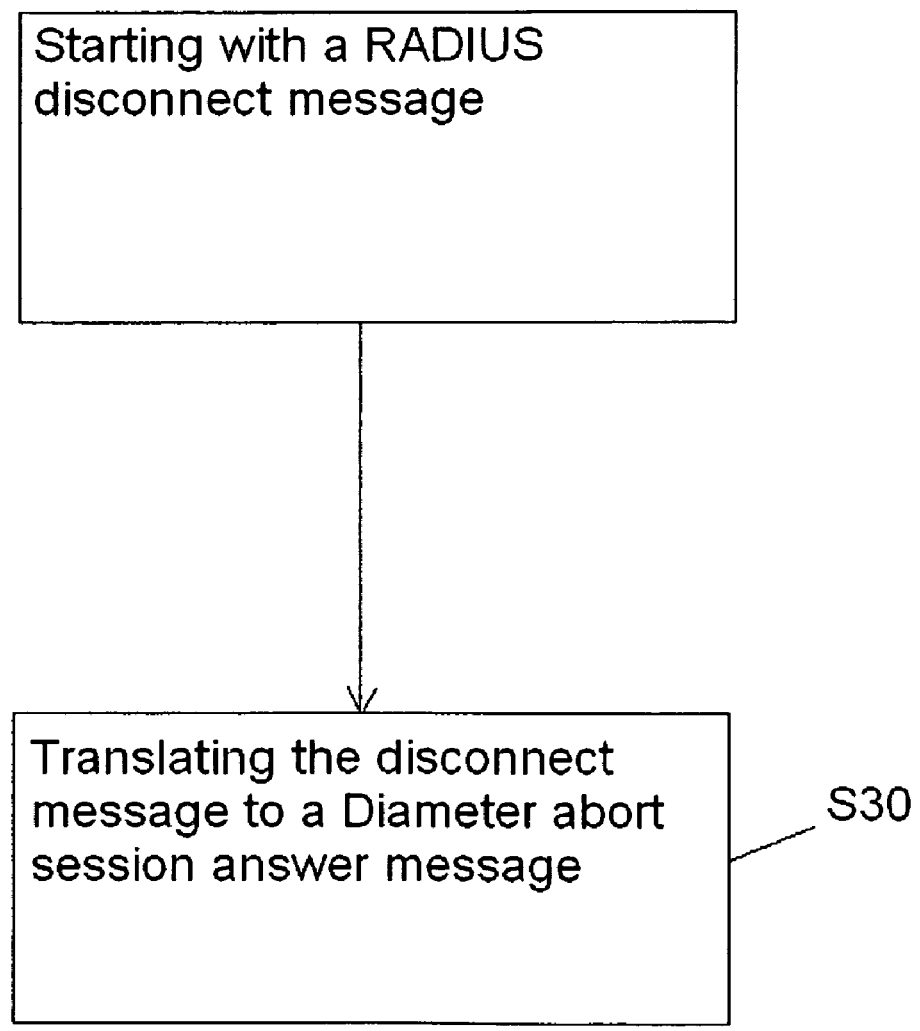
FIG. 3 illustrates method steps associated with translating a RADIUS disconnect message to a Diameter abort session answer message.

As further shown in Table 1, a disconnect message is translated to an abort session answer message, as shown in S30 of FIG. 3. For example, if the disconnect message is an acknowledgement disconnect message, the disconnect message may be translated to an abort session answer message with a result code set to success. As another example, if the disconnect message is a non-acknowledgement disconnect message, the disconnect message may be translated to an abort session answer message with a result code set to Diameter unable to comply.

Next, an embodiment of a method for translating Diameter messages to RADIUS messages will be described. In this embodiment, Diameter messages are translated to RADIUS messages as shown below Table 2.

TABLE 2

Diameter to RADIUS Message Translation

| From - Diameter | To - RADIUS |
|---|---|
| Credit Control Answer (Initial) with Result-Code set to SUCCESS (2001) | Initial Access-Accept |
| Credit Control Answer (Initial) with Result-Code set to Transient or Permanent Errors (4xxx or 5xxx), or other values properly | Initial Access-Reject |
| Credit Control Answer (Update) with Result-Code set to SUCCESS (2001) | Online Access-Accept |
| Credit Control Answer (Update) with Result-Code set to Transient or Permanent Errors (4xxx or 5xxx), or other values properly | Online Access-Reject |
| Credit Control Answer (Final) with Result-Code set to SUCCESS (2001) | Online Access-Accept |
| Credit Control Answer (Final) with Result-Code set to Transient or Permanent Errors (4xxx or 5xxx), or other values properly | Online Access-Reject |
| Abort Session Request | Disconnect-Request |

Figure 4:
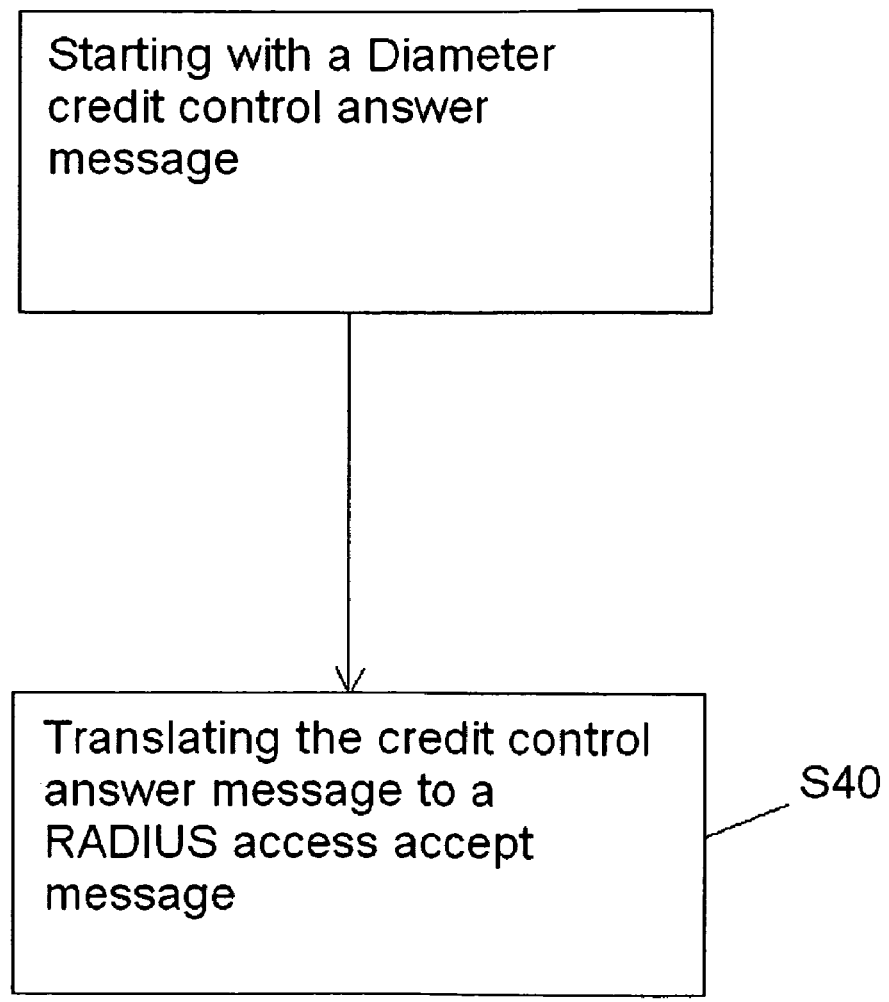
FIG. 4 illustrates method steps associated with translating a Diameter credit control answer message to a RADIUS access accept message.

As shown in Table 2, a credit control answer message is translated to an access accept message. as shown in S40 of FIG. 4. For example, if the credit control answer message is an initial credit control answer message with a result code set to success, the initial credit control answer message may be translated to an initial access accept message. In another example, if the credit control answer message is an update credit control answer message with a result code set to success, the update credit control answer message may be translated to an online access accept message. In a still further example, if the credit control answer message is a final credit control answer message with a result code set to success, the final credit control answer message may be translated to an online access accept message.

Figure 5:
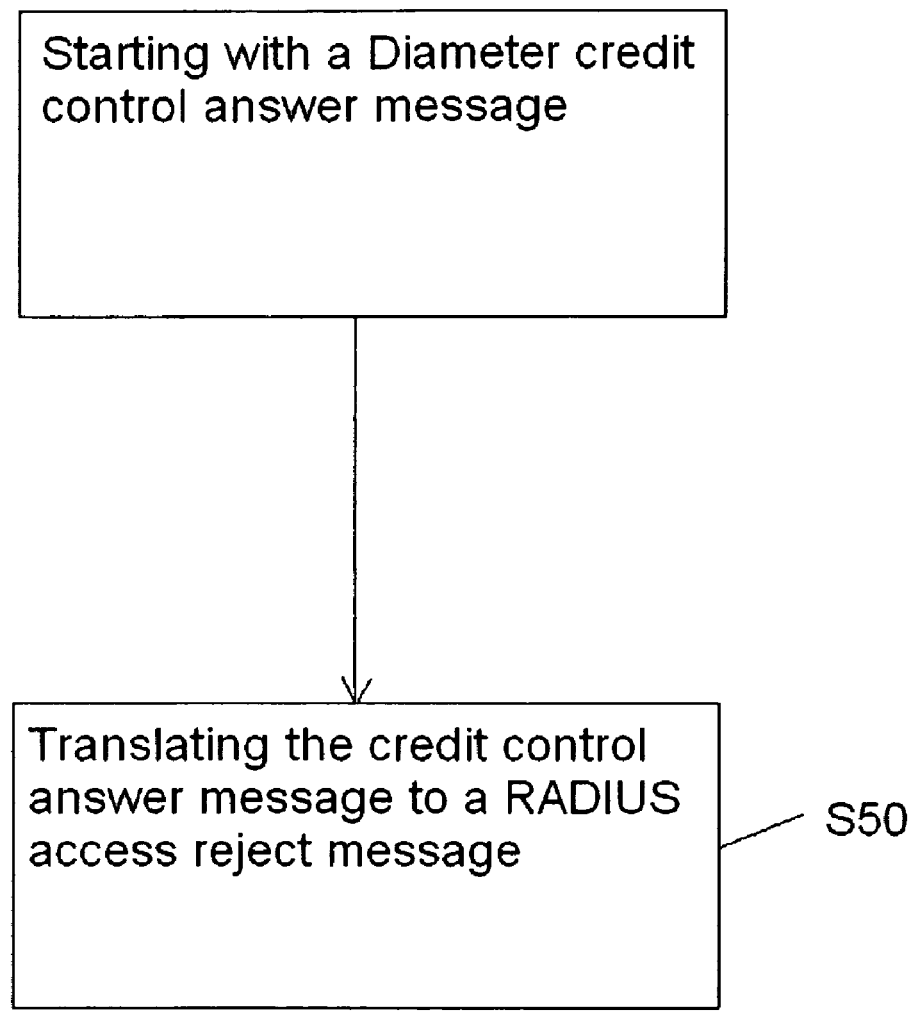
FIG. 5 illustrates method steps associated with translating a Diameter credit control answer message to a RADIUS access reject message.

As further shown in Table 2, a credit control answer message is translated to an access reject message. as shown in S50 of FIG. 5. For example, if the credit control answer message is an initial credit control answer message with a result code set to one of transient and permanent errors, the initial credit control answer message may be translated to an initial access reject message. As another example, if the credit control answer message is an update credit control answer message with a result code set to one of transient and permanent errors, the update credit control answer message may be translated to an online access reject message. In yet another example, if the credit control answer message is a final credit control answer message with a result code set to one of transient and permanent errors, the final credit control answer message may be translated to an online access reject message.

Figure 6:
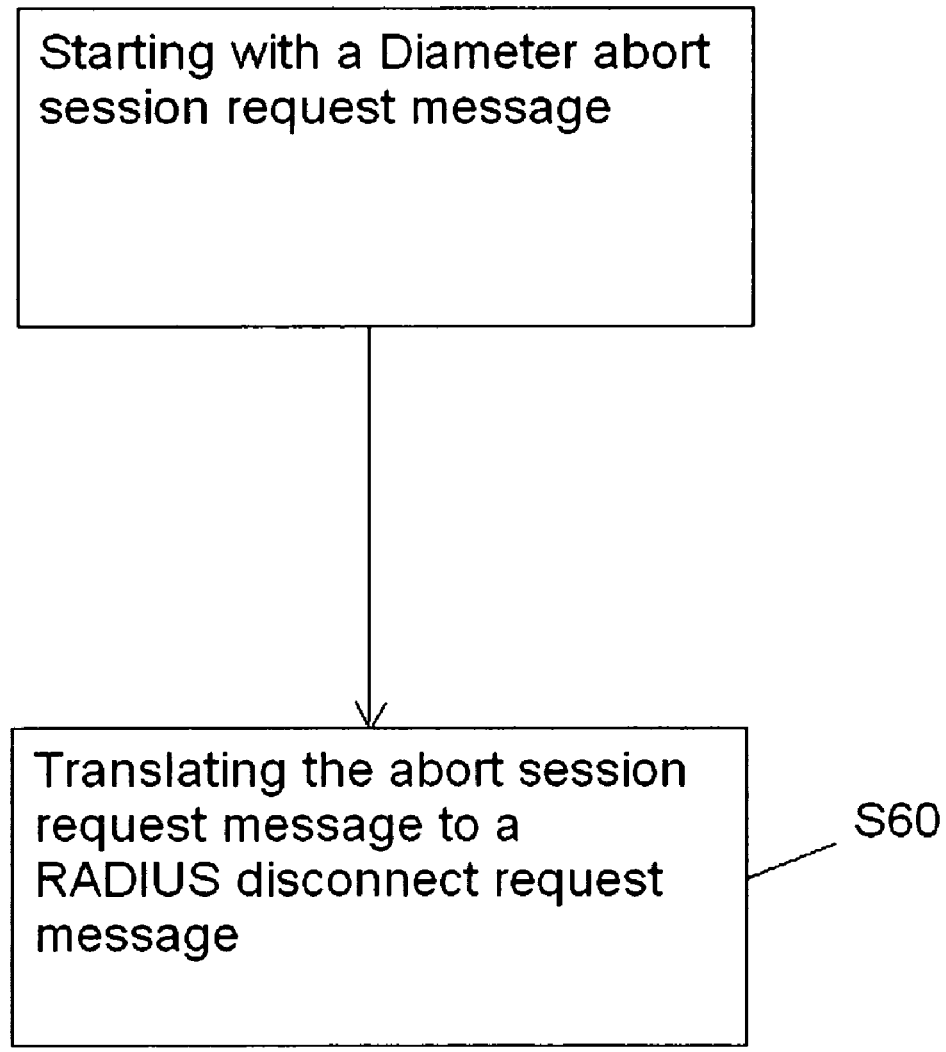
FIG. 6 illustrates method steps associated with translating a Diameter session request message to a RADIUS disconnect request message.

As still further shown in Table 2, an abort session request message is translated to a disconnect request message, as shown in S60 of FIG. 6.

Next, some example translations of RADIUS attributes to Diameter AVPs and Diameter AVPs to RADIUS attributes will be provided to give a further understanding of the message translation performed according to embodiments of the present invention. As will be appreciated, these descriptions rely on the well-known terminology, etc. set forth by the RADIUS and Diameter protocols as well as any related or extension protocols. Namely, for the sake of brevity, terminology known to one skilled in the art from these protocols has not be described in detail.

1 From Radius Access-Request to Diameter CCR

Application ID in Diameter message header should be set to 4

'P' bit in diameter message header should always be set.

'T' bit in diameter message header should be reset.

For the AVP 'M' bit, 'V' bit in the diameter message, 1.1 Diameter Mandatory AVPs Diameter Session-ID shall consist of the unique identifier of the NAS and the correlation ID and the NAS Identifier type (1 stands for NAS-Idnetifier, 2 stands for NAS-IP (v6)-Address). So Session ID will be one of the following formation:

1. NAS-Identifier; Correlation ID; 1

2. NAS-IP(v6)-Address; Correlation ID; 2

If NAS-Identifier is finally used as the key when doing the table searching, the first pattern should be used.

If NAS-IP is used as the key when doing searching, the second should be used. When NAS-IP is used, the format should be the same format as the one used for searching.

If "ALL" is used to search the table, the first pattern should be used if NAS_Identifier is present; otherwise, the second pattern should be used.

Diameter Origin-Host shall be NAS-Identifier or NAS-IP (v6)-Address which is used in Diameter Session ID.

Diameter Origin-Realm should be populated as Default Origin Realm in GP table.

Diameter Destination Realm should be populated as Default Destination Realm in GP table.

If the message is Initial Access-Request, Destination-Host shall be left blank and it should be determined by the logic in the Routing functionality.

Otherwise, Prepaid Server SubType in PPAQ AVP should be used to populate the Destnation-Host AVP.

Auth-Application-ID shall be populated as 4

CC-Request-Type will be populated as following:

1. INITIAL_REQUEST (Initial) when the message is Initial Access-Request

2. TERMINATION_REQUEST (Final) when the message is online Access-Request and one of the following conditions are met:

the Update Reason is 4, 5, 6

3. Otherwise, UPDATE_REQUEST

CC-Request-Number should be populated as follows:

1. 0 for Initial Access-Request.

2. Quota Identifier in PPAQ for online Access-Request which is translated to CCR Update 3. Quota Identifier in PPAQ+1 for online Access-Request which is translated to CCR Final Service-Context-Identifier shall be hardcoded to translator@radius.com Framed-IP-Address should be the same as in Radius. It shall be populated if it is received in Access-Request. Otherwise, it should be populated as default 255.255.255.255

All of the following Diameter Mandatory AVPs should be present with default value of the corresponding type:

Called-Station-ID

3GPP-charging-Characteristics

3GPP-Charging-ID

3GPP-QoS-Negotiated-Profile

3GPP-IMSI

3GPP-NSAPI

3GPP-Selection-Mode

Rulebase-ID

3GPP-CG-Address (255.255.255.255)

3GPP-GGSN-Address (255.255.255.255)

Note:

1. 3GPP-IMSI is a mandatary AVP and the length should be 1-15. Any character or digits string is fine.

2. 3GPP-QoS-Negotiated-Profile has three formats: Release 98, Release 99 and Release 5. Any format is OK.

Release 98 format: "98-Qos Profile UTF-8 Encoding(6 Octets)" One example for Release 98: "98-000000"

Release 99 format: "99-QoS profile UTF-8 Encoding (22 Octets)"

Release 5 format: "05-Qos profile UTF-8 Encoding(28 Octets)"

According to the following priorities, 3GPP-SGSN-Address should be populated as:

1. NAS-IP-Address attribute if it is present in the incoming message.

2. NAS Identifier Alias in the corresponding record of DCI table if it is neither NULL nor IPv6 address, and NAS-Identifier is used to search this table. If NAS-IPv6-Address is not present and NAS Identifier Alias in the record is IPv6 address, 3GPP-SGSN-IPv6-Address will be populated as NAS Identifier Alias.

3. Otherwise, it should be provisioned as 255.255.255.255 3GPP-SGSN-IPv6-Address will be populated as NAS-IPv6-Address if it is present.

1.2 Optional Diameter AVPs

The following AVPs have the same format/meaning in both Diameter and Radius:

Diameter User-Name AVP <- - - -> Radius NAI

Diameter Event-TimeStamp <- - - -> Radius Event-Timestamp

Note:

Aforementioned Event-Timestamp has different start date in Radius and Diameter. In Radius, the timestamp is since 1970 instead of 1900 which is used by Diameter. Conversion should be made to finish the translation.

Subscription-ID shall only be included in CCR Initial.

One Subscription-ID with Subscription-ID-Type "END_USER_E164" should be included Another Subscription-ID will be included according to the following rules:

1. If NAI is chosen to generate the E164 number, Subscription-ID with Subscription-ID-Type "END_USER_NAI" shall be included. The value of NAI should be used as Subscription-ID-Data 2. If Calling-Station-ID is used, Subscription-ID with type "END_USER_IMSI" should be included. The value of Calling-Station-ID should be used as Subscription-ID-Data.

If NAI and Calling-Station-ID are both present, Subscription ID Data Source should be used to determine where to get the user identifier. If only one of them is present, it shall be used regardless of the GP data.

If NAI is used, the MDN part of MDN@realm shall be used. The MDN/IMSI determined should be converted to E164 format according The service shall convert the MDN(IMSI) into international E1.64 format according to the prefix of the MDN (IMSI) and specified Dialzone Plan. The international format number will be used in the call processing. The logic to perform the conversion is:
1) The service should try to retrieve an International Number Conversion record. The record is found by finding a match of the specified Dialzone Plan and the prefix match with the National Number Prefix.
2) Once a match is found, the matched prefix in the received MDN(IMSI) will be replaced with the International Number Prefix of the matched INC record.
3) If no match can be found with above rules, the received MDN(IMSI) will not be modified.

Note: The matching logic is done by using the International Number Conversion (INC) Table with the Dialzone Plan and National Number Prefix as key.

The following priority of Dial Zone Plan shall be used for INC search:
1. GP Default Dial Zone Plan
2. ALL Multiple-Services-Indicator shall only be included in CCR Initial and it should be set to "MULTIPLE_SERVICES_SUPPORTED"

Multiple-Services-Credit-Control (MSCC) group AVP shall only be included in CCR Update and Final. The detailed AVP in this group should be included Rating-Group in MSCC should be mapped to Service Option. In this version, GP Data Category ID for Main Service Instance shall be used.

Reporting-Reason in MSCC should be "FINAL" if it is CCR Final and "THRESHOLD" for CCR Update.

Used-Service-Unit should be populated as following rules:
1. CC-Time should be included if DurationQuota is present and the value should be gotten from Duration-Quota
2. CC-Total-Octets should be included if VolumeQuota is present. The value should be deduced from Volume-Quota and VolumeQuotaOverflow. (Refer to Radius Signaling and Protocol for detailed information)

1.3 Service Parameter Info AVP used for Radius Translation

Service Parameter Info is one optional AVP in Diameter messages. It can be defined as needed and be used as long as both the client and the server know what it means. The format is:

Service-Parameter-Info::=<AVP Header: 440>[Service-Parameter-Type][Service-Parameter-Value]

All the Service-Parameter-T pe AVP used in this section has the same first two octets—"1010101010 00000001". Octets 3 and 4 will be used from 507 in decimal. The type of this AVP is integer.

Servie-Parameter-Value is string whose length can be up to 512 bytes. The length of each service parameter is specified in their requirements.

In the following table, Service-Parameter-Type is abbreviated to Type and Service-Parameter-Value is abbreviated to Value.

| Name in Radius | Octets 3 and 4 of type | Length of Type | Value Format | Note for Value |
|---|---|---|---|---|
| Prepaid and Termination Capability of Radius client | 507 | 1 | Digit string(1) | This parameter specifies the capability of the Radius client. It is one enum which has the following values: 0 - Not prepaid Capable 1 - Prepaid capable (can't be prepaid client) 2 - (Prepaid capable) Can be prepaid client This AVP should only be included for Initial Access-Request |
| The element identity | 508 | 1 | Digit string(1) | Specifies the identity of the message sender. It is one enum which has the following values: 0 - PDSN 1 - HA This AVP should only be included for Initial Access-Request |
| Home Agent IP Address | 509 | 39 | string(39) | This shall be included when HA IP Address is present in the incoming Radius Messages |
| Prepaid Error | 510 | 3 | Digit string(3) | Identifies the error reason for the prepaid serveice. If it is received from the Prepaid client, its value is one of the following enum values: 0 - Incorrect Quota Type received 1 - Quota not received for a prepaid session 2 - Quota received for a non-prepaid session 3 - PPP could not be successfully established with |

| Name in Radius | Octets 3 and 4 of type | Length of Type | Value Format | Note for Value |
|---|---|---|---|---|
| | | | | the MS<br>Otherwise - Unspecified<br>If it is from prepaid server to client, its value is one of the following enum values:<br>0 - Pre-emptive allocation error (Default) |
| Update Reason | 511 | 3 | Digit string(3) | This parameter is used to specify the real reason for the update received from the Radius Client. Enum value are one of the followings:<br>1 - Pre-Initialization<br>2 - Initial Request<br>3 - Threshold Reached<br>4 - Quota Reached<br>5 - Remote Forced Disconnect<br>6 - Client Service Termination<br>7 - Main SI Released<br>8 - Service Instance not established<br>9 - Tariff Switch Update |
| IP Technology | 514 | 1 | Digit String(1) | Specify the session type and it shall be included for Initial Access Request translation. The value should be one of the following:<br>1 - SIP<br>2 - MIP |
| NAS-Identifier | 515 | 64 | string(64) | Specifiy the NAS-Identifier. It shall be included when:<br>1. if it is present in the incoming Access-Request<br>2. Not present in message and NAS IP is used to search DCI table and NAS Identifier Alias is not NULL. |

Note:
For the Enum values, the default value marked shall be used when the received value is outside the valid range.

2 From Diameter Credit Control Answer (CCA) to Radius Access-Accept (Reject)

If the destination rating engine is selected by routing functionality (Initial Access-Request or no server information in online-Access-Request), CCA together with the IP Address of the selected Rating Server should be gotten from the Routing functionality.

In a normal situation, when there is no protocol, internal, or communication error occurred, the router shall translate the Diameter messages into RADIUS according to the following table.

Also the router may generate OM log and translate the Diameter message to Radius message according to following table for certain cases.

| From | To |
|---|---|
| Credit Control Answer (Initial) with Result-Code set to SUCCESS (2001) | Initial Access-Accept |
| Credit Control Answer (Initial) with Result-Code set to Transient or Permanent Errors (4xxx or 5xxx) | Initial Access-Reject |
| Credit Control Answer (Initial) with other Result code | Initial Access-Reject |
| Credit Control Answer (Update) with Result-Code set to SUCCESS (Both Command arid MSCC level) (2001) | Online Access-Accept |
| Credit Control Answer (Update) with Result-Code set to Transient or Permanent Errors (Command level or MSCC level) (4xxx or 5xxx) | Online Access-Reject |
| Credit Control Answer (Final) with Result-Code set to SUCCESS (2001) | Online Access-Accept |
| Credit Control Answer (Final) with Result-Code set to Transient or Permanent Errors (4xxx or 5xxx) | Online Access-Reject |
| Credit Control Answer (Update/Final) with other result code | Online Access-Reject |

Initial(online) access-reject should always be empty.

Measurement 9 should be increased after it is sent successfully.

Granted-Service-Unit and Used-Service-Unit in MSCC shall be used to get the quota allocation and quota usage information. Only one of the MSCC (if more than one) with the category ID equal to Category ID for Main Service Instance in GP table shall be used.

For Initial Access-Accept, if Quota is granted in the CCA (CC-Total-Octets or CC-Time is present in Granted-Service-Units with positive value), The following rules should be followed:

PPAC should set the subType 2 (SfS) to the corresponding value:

1—Usage of Prepaid Accouting for Volume if volume quota is granted

2—Usage of Prepaid Accouting for Duration if duration quota is granted

PPAQ should be set as follows:

Quota-Identifier in PPAQ should be Request-Number AVP in CCA+1

If CC-Total-Octets is greater than zero, VolumeQuota and VolumeThreshold in PPAQ should be deduced from CC-Total-Octets and Volume-Quota-Threshold, respectively.

VolumeQuotaOverflow and VolumeThresholdOverflow may be used if necessary.

If CC-Total-Octets is not present or the value is zero and CC-Time is greater than zero, DurationQuota and DurationThreshold in PPAQ should be deduced from CC-Time and Time-Quota-Threshold, respectively.

For both Volume and Duration charging, the threshold and quota in the outgoing radius message should be deduced as follows:
1. quota in radius=the allocated quota in diameter message
2. threshold in radius=(the allocated quota in diameter message–the corresponding threshold If the corresponding threshold is zero or doesn't exist in diameter message, it shall be set to the same value as the quota PrepaidServer should be included and the value should be set to the selected Prepaid Server.

If the session is determined to be SIP, STC with value 1 should be included.

If the session is determined to be MIP, STC with value 3 should be included.

When no Quota is granted for Initial Access-Accept, the following should be followed:
1. If Prepaid Error is received in CCA indicating "Preemptive allocation error", PPAC with subType 2 (SfS) set to 1 shall be included in the Access-Accept without PPAQ.
2. If the session is determined to be MIP session and the NAS is PDSN, STC with value 2 should be returned.
3. Empty Initial Access-Accept should be replied when neither of the above 2 items are met.

For online Access-Accept, if Quota is granted in the CCA, the following rules should be followed:

PPAQ should be included

User-Name, Framed-IP-Address (Framed-IPv6-Prefix), Framed-Interface-ID, Correlation ID should be included with the value according to the corresponding online Access-Request Idle-Timeout should be included if it is present in the CCA. Service Parameter Info AVP shall be used to carry this information.

Service-Parameter-Type: first two octets—"1010101010 00000001". Octets 3 and 4 516 in decimal shall be used Servie-Parameter-Value: Digit string(10)

For detailed information about Service Parameter Info

For online Access-Requests, if Quota is not granted in CCA, User-Name, Framed-IP-Address (Framed-IPv6-Prefix), Correlation ID should be included in Access-Accept with the value according to the corresponding online Access-Request.

The present invention provides a methodology for translating RADIUS messages into Diameter messages and a methodology for translating Diameter message to RADIUS messages. The methodologies are applicable to IS-835 RADIUS. Accordingly, embodiments of the present invention relieve vendors from having to support RADIUS based prepaid service defined in IS-835, and provides a smooth transition that bridges RADIUS-based CDMA prepaid packet data service to the Diameter online architecture such as in 3GPP2.

The invention being thus described, it will be obvious that the same may be varied in many ways. For example, while an example implementation of the present invention has been described with respect to a CDMA system, it will be appreciated that the present invention is applicable to other standards based systems. Such variations are not to be regarded as a departure from the invention, and all such modifications are intended to be included within the scope of the invention.

We claim:

1. A method of translating a remote authentication dial in user service (RADIUS) message to a Diameter message, comprising:
    translating, by a network element, an access request message to a credit control request message,
    binding, by the network element, the credit control message to a Diameter manager by inserting an IP address of the Diameter manager into the credit control message,
    the binding of the credit control message being accomplished without the network element needing to perform a routing lookup, and without needing to perform a state determination.

2. The method of claim 1, wherein if the access request is an initial access request, the translating step translates the initial access request to an initial credit control request message.

3. The method of claim 1, wherein if the access request is an on-line access request that includes an update reason set to one of pre-initialization, initial request, threshold reached, service instance not established, tariff switch update and main service instance released, the translating step translates the access request to an update credit control request.

4. The method of claim 1, wherein if the access request is an online access request that includes an update reason set to one of quota reach, remote forced disconnect and client service termination, the translating step translates the access request to a final credit control request message.

5. A method of translating a remote authentication dial in user service (RADIUS) message to a Diameter message, comprising:
    translating, by a network element, a disconnect message to an abort session answer message,
    binding, by the network element, the abort session answer message to a Diameter manager by inserting an IP address of the Diameter manager into the abort session answer message,
    the binding of the abort session answer message being accomplished without the network element needing to perform a routing lookup, and without needing to perform a state determination.

6. The method of claim 5, wherein if the disconnect message is an acknowledgement disconnect message, the translating step translates the disconnect message to an abort session answer message with a result code set to success.

7. The method of claim 5, wherein if the disconnect message is a non-acknowledgement disconnect message, the translating step translates the disconnect message to an abort session answer message with a result code set to DIAMETER unable to comply.

8. A method of translating a DIAMETER message to a remote authentication dial in user service (RADIUS) message, comprising:
    translating, by a network element, a credit control answer message to an access accept message, routing, by the network element, the access accept message to a Radius server by inserting an IP address of the Radius Server into the access accept message, the routing of the access accept message being accomplished without the network element needing to perform a routing lookup, and without needing to perform a state determination.

9. The method of claim 8, wherein if the credit control answer message is an initial credit control answer message with a result code set to success, the translating step translates the initial credit control answer message to an initial access accept message.

10. The method of claim 8, wherein if the credit control answer message is an update credit control answer message with a result code set to success, the translating step translates the update credit control answer message to an online access accept message.

11. The method of claim 8, wherein if the credit control answer message is a final credit control answer message with a result code set to success, the translating step translates the final credit control answer message to an online access accept message.

12. A method of translating a Diameter message to a remote authentication dial in user service (RADIUS) message, comprising:

translating, by a network element, a credit control answer message to an access reject message, routing, by the network element, the access reject message to a Radius server by inserting an IP address of the Radius Server into the access reject message, the routing of the access reject message being accomplished without the network element needing to perform a routing lookup, and without needing to perform a state determination.

13. The method of claim 12, wherein if the credit control answer message is an initial credit control answer message with a result code set to one of transient and permanent errors, the translating step translates the initial credit control answer message to an initial access reject message.

14. The method of claim 12, wherein if the credit control answer message is an update credit control answer message with a result code set to one of transient and permanent errors, the translating step translates the update credit control answer message to an online access reject message.

15. The method of claim 12, wherein if the credit control answer message is a final credit control answer message with a result code set to one of transient and permanent errors, the translating step translates the final credit control answer message to an online access reject message.

16. A method of translating a DIAMETER message to remote authentication dial in user service (RADIUS) message, comprising:

translating, by a stateless network element, an abort session request message to a disconnect request message, routing, by the network element, the disconnect request message to a Radius server by inserting an IP address of the Radius Server into the disconnect request message, the routing of the disconnect request message being accomplished without the network element needing to perform a routing lookup, and without needing to perform a state determination.

\* \* \* \* \*